(12) United States Patent
Burrow

(10) Patent No.: US 6,399,016 B2
(45) Date of Patent: Jun. 4, 2002

(54) DIRECT SMELTING PLANT

(75) Inventor: Andrew Charles Burrow, Melville (AU)

(73) Assignee: Technological Resources Pty. Ltd., Melbourne (AU)

(*) Notice: Subject to any disclaimer, the term of this patent is extended or adjusted under 35 U.S.C. 154(b) by 0 days.

(21) Appl. No.: 09/800,437

(22) Filed: Mar. 5, 2001

(30) Foreign Application Priority Data

Mar. 16, 2000 (AU) .................................................. P6306

(51) Int. Cl.[7] .................................................. C21C 1/00
(52) U.S. Cl. ........................ 266/142; 266/144; 266/166; 266/195; 266/216; 266/227; 266/236
(58) Field of Search ................................. 266/142, 144, 266/216, 227, 236, 166, 195

(56) References Cited

U.S. PATENT DOCUMENTS

| | | |
|---|---|---|
| 4,083,715 A | 4/1978 | Langhammer |
| 4,389,043 A | 6/1983 | Weber et al. |
| 4,701,214 A | 10/1987 | Kaneko et al. |
| 5,060,913 A * | 10/1991 | Reid ........................ 266/195 |
| 6,322,745 B1 * | 11/2001 | Leigh et al. ................. 266/236 |

FOREIGN PATENT DOCUMENTS

WO    WO 97/23656    7/1997

* cited by examiner

*Primary Examiner*—Melvyn Andrews
(74) *Attorney, Agent, or Firm*—Merchants & Gould, P.C.

(57) ABSTRACT

Direct smelting plant for producing molten metal from a metalliferous feed material induces a smelting vessel 11 to hold a molten metal and slag bath beneath a hot gas space. Solids injection lances 27 extend downwardly and inwardly through side walls of the vessel and hot oxidising gas is directed downwardly into the gas space by a central vertical gas injection lance 26. The plant layout is divided into four functional zones spaced circumferentially around vessel 11 and radiating outwardly from the vessel. Zone 1 contains an overhead hot gas delivery duct 31 supplying gas to lance 26 and an offgas duct 32; Zone 2 contains a forehearth 19 and forehearth tapping launder 34; Zone 3 contains slag notches 45 and slag launders 46; and Zone 4 contains a primary slag drain taphole and launder 48. This layout minimises the potential for interference between the transport of the hot gases, the metaliferous feed material, and the molten metal and slag.

17 Claims, 7 Drawing Sheets

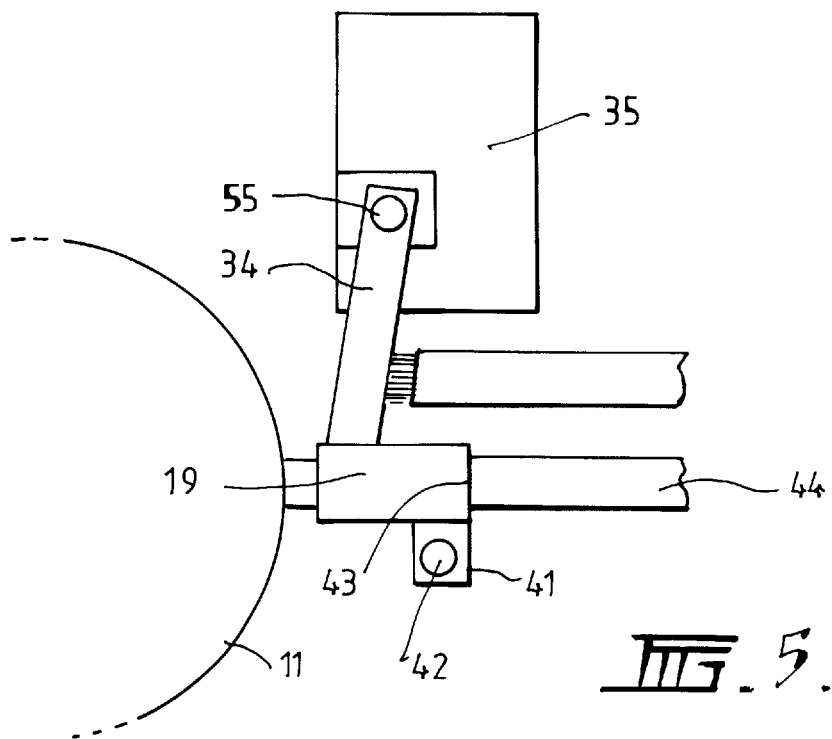
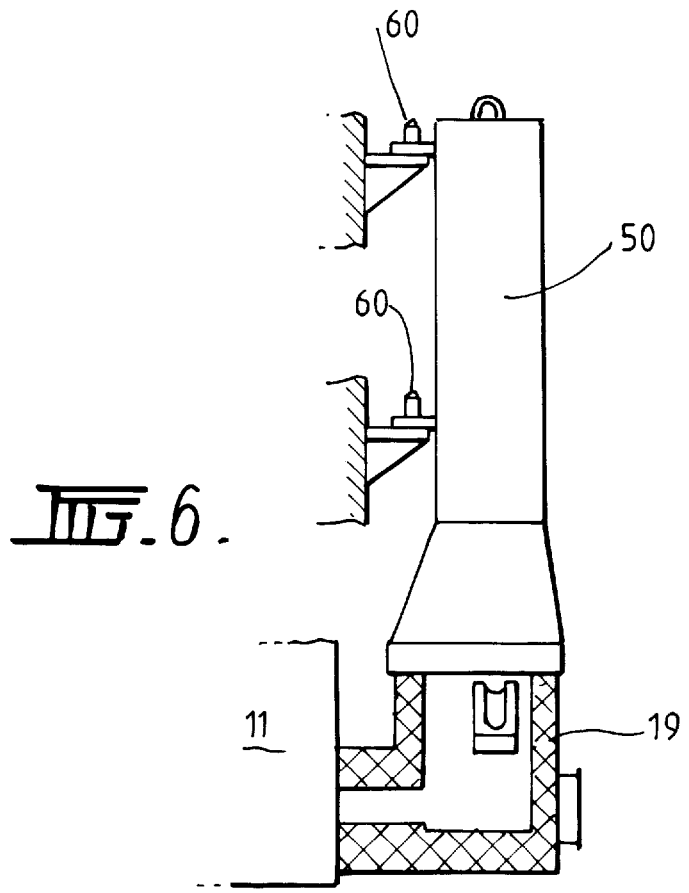

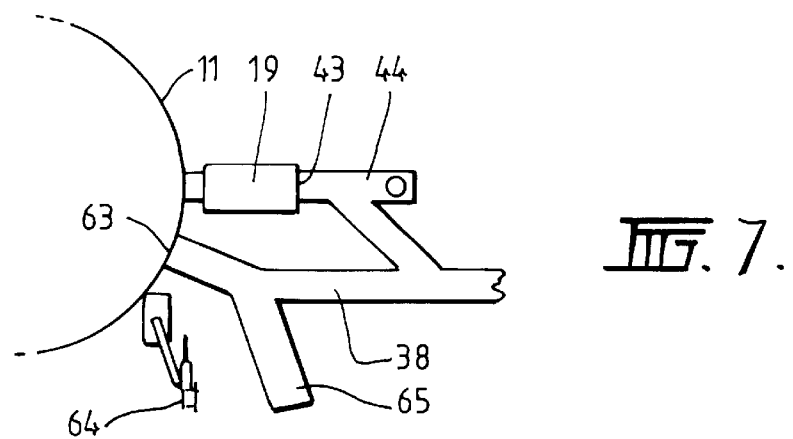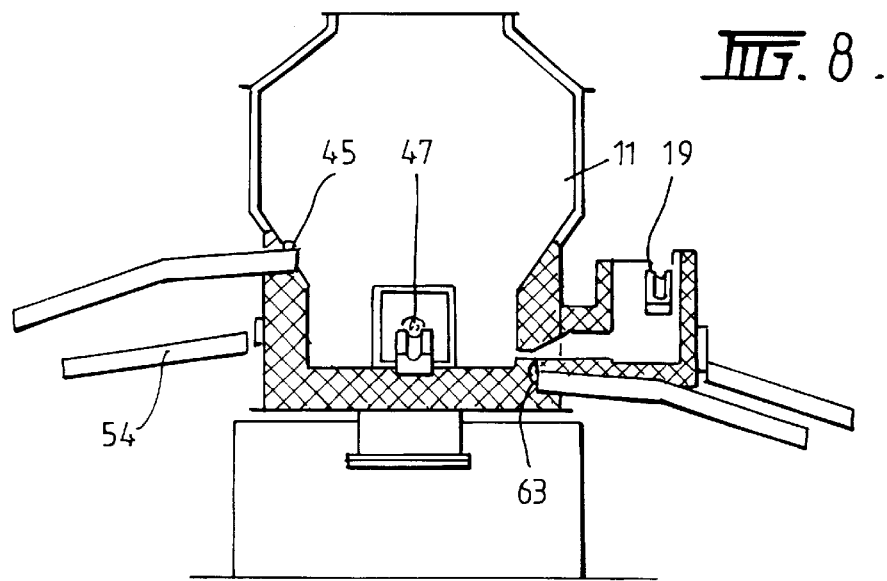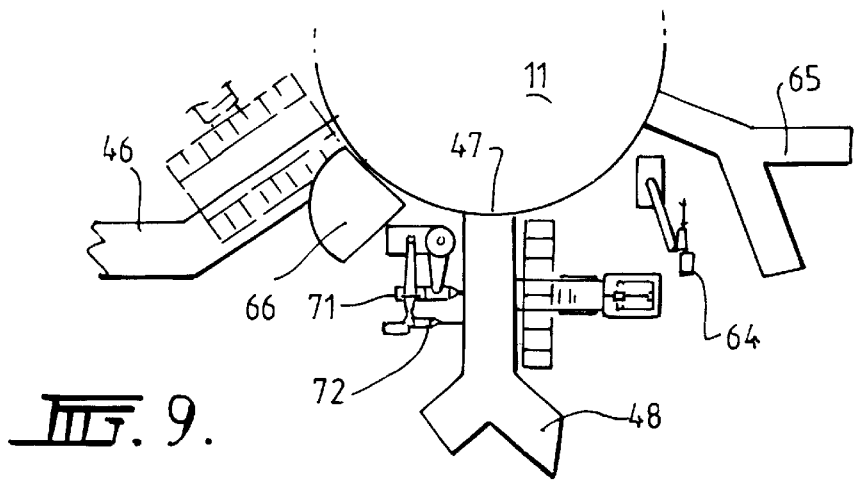

DIRECT SMELTING PLANT

TECHNICAL FIELD

The present invention relates to direct smelting plant for producing molten metal in pure or alloy form from a metalliferous feed material such as ores, partly reduced ores and metal-containing waste streams.

A known direct smelting process, which relies principally on a molten metal layer as a reaction medium, and is generally referred to as the HIsmelt process, is described in International Application PCT/AU96/00197 (WO 96/31627) in the name of the applicant.

The HIsmelt process as described in the International application comprises:
  (a) forming a bath of molten iron and slag in a vessel;
  (b) injecting into the bath:
     (i) a metalliferous feed material, typically metal oxides; and
     (ii) a solid carbonaceous material, typically coal, which acts as a reductant of the metal oxides and a source of energy; and
  (c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. Offgases resulting from the post-combustion of reaction gases in the vessel are taken away from the upper part of the vessel through an offgas duct.

The HIsmelt process enables large quantities of molten metal to be produced by direct smelting in a single compact vessel. However, in order to achieve this it is necessary to transport hot gases to and from the vessel, to transport the metalliferous feed material to the vessel and to transport the molten metal product and slag away from the vessel all within a relatively confined area. These functions must continue throughout a smelting operation which can be extended over a long period. It is also necessary to provide access and handling facilities to enable access to the vessel and lifting of equipment between smelting operations. The present invention enables a very effective arrangement of plant by which facilities for various functions are separated into distinct zones disposed about the vessel so as to minimise the potential for interference between the various functions and to maximise safety of the smelting operations.

DISCLOSURE OF THE INVENTION

According to the invention, there is provided direct smelting plant for producing molten metal from a metalliferous feed material including:
  a fixed smelting vessel to hold a molten bath having a metal layer and a slag layer on the metal layer and a gas space above the slag;
  a solids feed means to supply metalliferous feed material and carbonaceous material into the vessel;
  gas injection means extending downwardly into the vessel to inject oxidising gas into the gas space and/or the slag layer in the vessel;
  gas delivery duct means extending from a gas supply location away from the vessel to a delivery location above the vessel for delivery of oxidising gas into the gas injection means;
  offgas duct means for flow of offgas from an upper part of the vessel away from the vessel;
  a metal tapping means for flow of molten metal from the bath during a smelting operation out of a lower part of the vessel;
  a metal tapping launder to receive molten metal from the metal tapping means and to transport that molten metal away from the vessel;
  slag tapping means in a side wall of the vessel for tapping slag from the bath during a smelting operation; and
  slag tapping launder means to receive slag from the slag tapping means and to transport that slag away from the vessel;
    wherein the oxidising gas delivery duct means and the offgas duct means extend in a first of three discrete zones spaced circumferentially about the vessel and extending outwardly from the vessel;
    the metal tapping means and metal tapping launder are disposed in a second of said three zones; and
    the slag tapping means and slag tapping launder means are located in the third of said zones.

Preferably, the second and third zones are disposed to mutually opposite sides of the smelting vessel and the first zone is disposed between the second and third zones circumferentially of the vessel.

Preferably too, the plant further comprises slag draining means for draining slag from the lower part of the vessel at the end of a smelting operation, the means being lower than the slag tapping means, and slag drain launder means to receive slag from the slag draining means and to transport it away from the vessel.

Preferably further, the slag draining means and the slag drain launder are located in a fourth discrete zone extending outwardly of the vessel between the second and third zones.

Preferably further, the fourth zone is disposed generally opposite to the first zone relative to the vessel.

The metal tapping means may comprise a metal flow forehearth projecting outwardly from the lower part of the vessel.

The plant may further include a metal holding means disposed away from the vessel and the metal tapping launder may extend to the holding means to deliver molten metal into the holding means.

Preferably the plant further includes gas heating means at the gas supply location to supply hot gas to the gas delivery duct means for injection into the vessel.

The gas delivery duct means may comprise a single gas duct extending from the gas supply location to the delivery location.

The solids feed means may comprise one or more solids injection lances.

More particularly, there may be a plurality of solids injection lances spaced circumferentially of the vessel. Each of the lances may extend downwardly and inwardly into the vessel through a side wall of the vessel.

The slag tapping means may comprise a pair of slag tapping notches in the side wall of the vessel.

The vessel may be disposed about a central upright axis and said zones may radiate outwardly of the central axis outside the vessel.

BRIEF DESCRIPTION OF THE DRAWINGS

In order that the invention may be more fully explained, one particular embodiment will be described in detail with reference to the accompanying drawings in which:

FIG. 5 is a diagrammatic plan of slightly modified metal handling facilities;

FIG. 6 illustrates a forehearth eruption containment hood;

FIG. 7 is a diagrammatic plan of a forehearth tap-hole and launder;

FIG. 8 is a schematic section through the vessel and the metal and slag handling facilities;

FIG. 9 is a schematic layout of slag drain tap-hole facilities;

DETAILED DESCRIPTION OF THE PREFERRED EMBODIMENT

Figure 1:
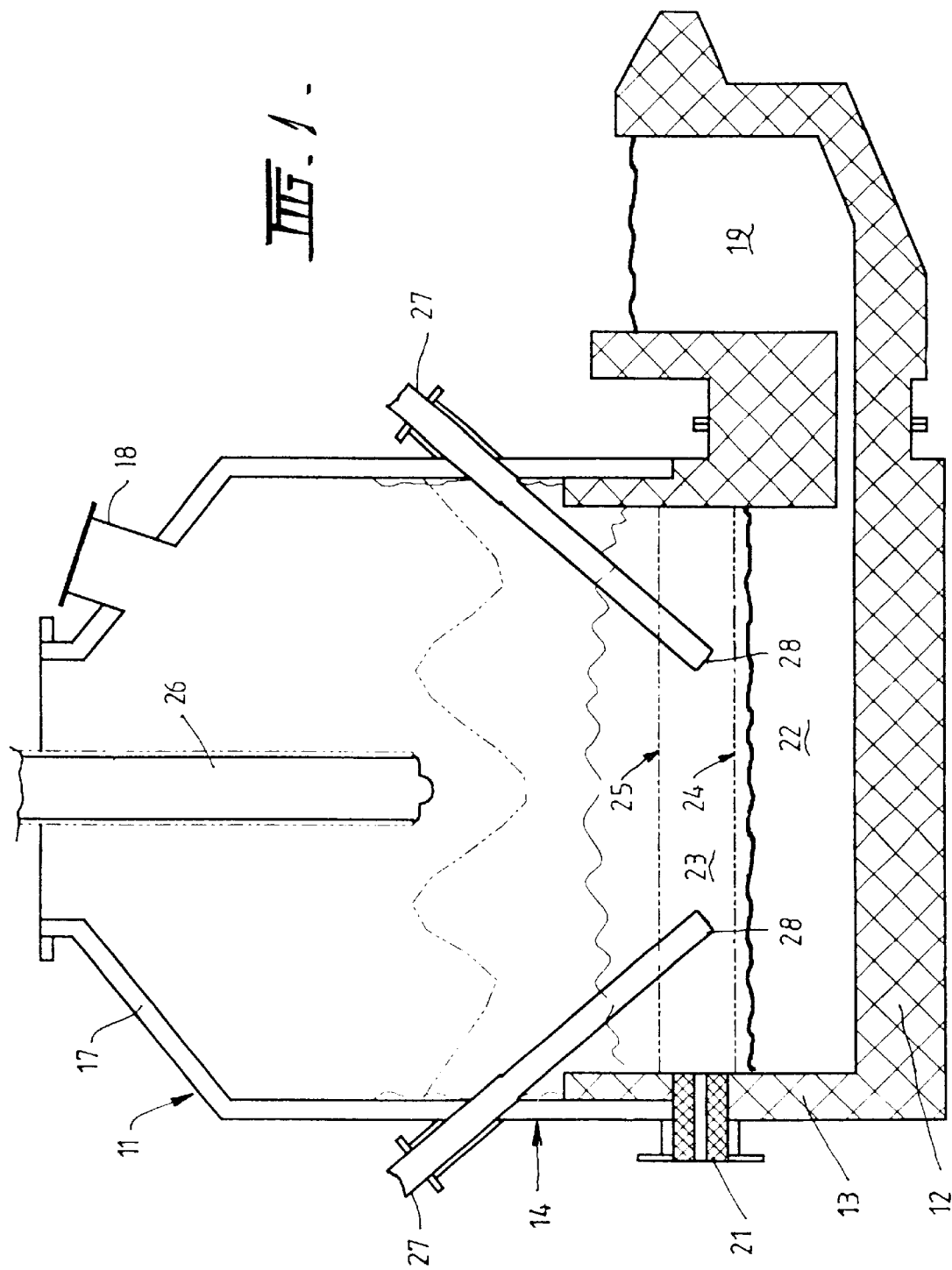
FIG. 1 is a vertical cross-section through a direct smelting vessel incorporated in a smelting plant layed out in accordance with the present invention.

FIG. 1 illustrates a direct smelting vessel suitable for operation by the HIsmelt process as described in International Patent Application PCT/AU96/00197. The metallurgical vessel is denoted generally as 11 and has a hearth that incudes a base 12 and sides 13 formed from refractory bricks; side walls 14 which form a generally cylindrical barrel extending upwardly from the sides 13 of the hearth and which incudes an upper barrel section and a lower barrel section; a roof 17; an outlet 18 for offgases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel may be fitted with a downwardly extending gas injection lance 26 for delivering a hot air blast into an upper region of the vessel and eight solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

Gas injection lance 26 receives an oxygen enriched hot air flow through a hot gas delivery duct 31 which extends from a hot gas supply station located some distance away from the reduction vessel 11. The hot gas supply station may incorporate a series of hot gas stoves and an oxygen plant to enable an oxygen enriched air stream to be passed through the hot gas stoves and into the hot gas delivery duct 31 which extends to a connection with the gas injection lance 26 at a location above the reduction vessel 11. Alternatively the oxygen may be added to the air stream after the air stream has been heated by the stoves.

The offgas outlet 18 is connected to an offgas duct 32 which transports the offgas away from the reduction vessel 11 to a treatment station where it may be cleaned and passed through heat exchangers for preheating the materials fed to the reduction vessel 11.

The hot gas delivery duct 31 and offgas duct 32 must extend away from the upper part of the vessel to remote locations and they may therefore interfere with the operation of overhead cranes or mobile handling equipment required for maintenance of the vessel and for transporting hot metal and hot slag away from the vessel during smelting operations. Hot metal from the vessel is delivered through the forehearth 19 and must be taken away through a hot metal launder system that preferably includes a surge launder and a forehearth drain tap launder. There must also be a slag tapping system comprising one or more slag notches and launders and also a slag draining system to drain slag from the lower part of the vessel at the end of a smelting operation. The present invention enables installation and operation of all this equipment around the compact reduction vessel 11 in a way which separates the various operational functions into separate zones spaced circumferentially around the vessel, so minimising interference between the various operations and operation of handling equipment and accordingly, maximising operational safety.

Figure 2:
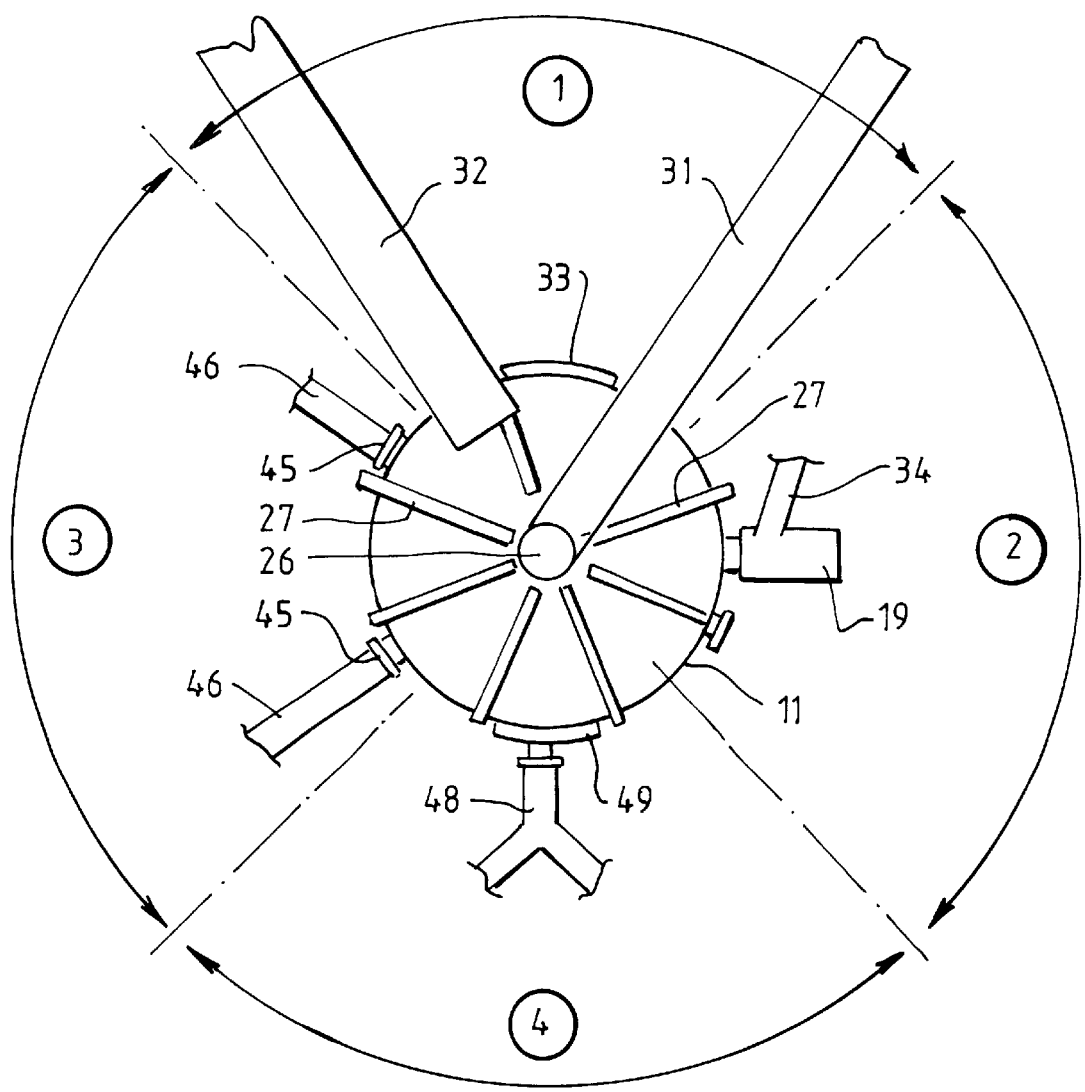
FIG. 2 is a diagrammatic plan of the vessel showing four separate operational zones spaced circumferentially about the vessel and radiating outwardly from it.
Figure 3:
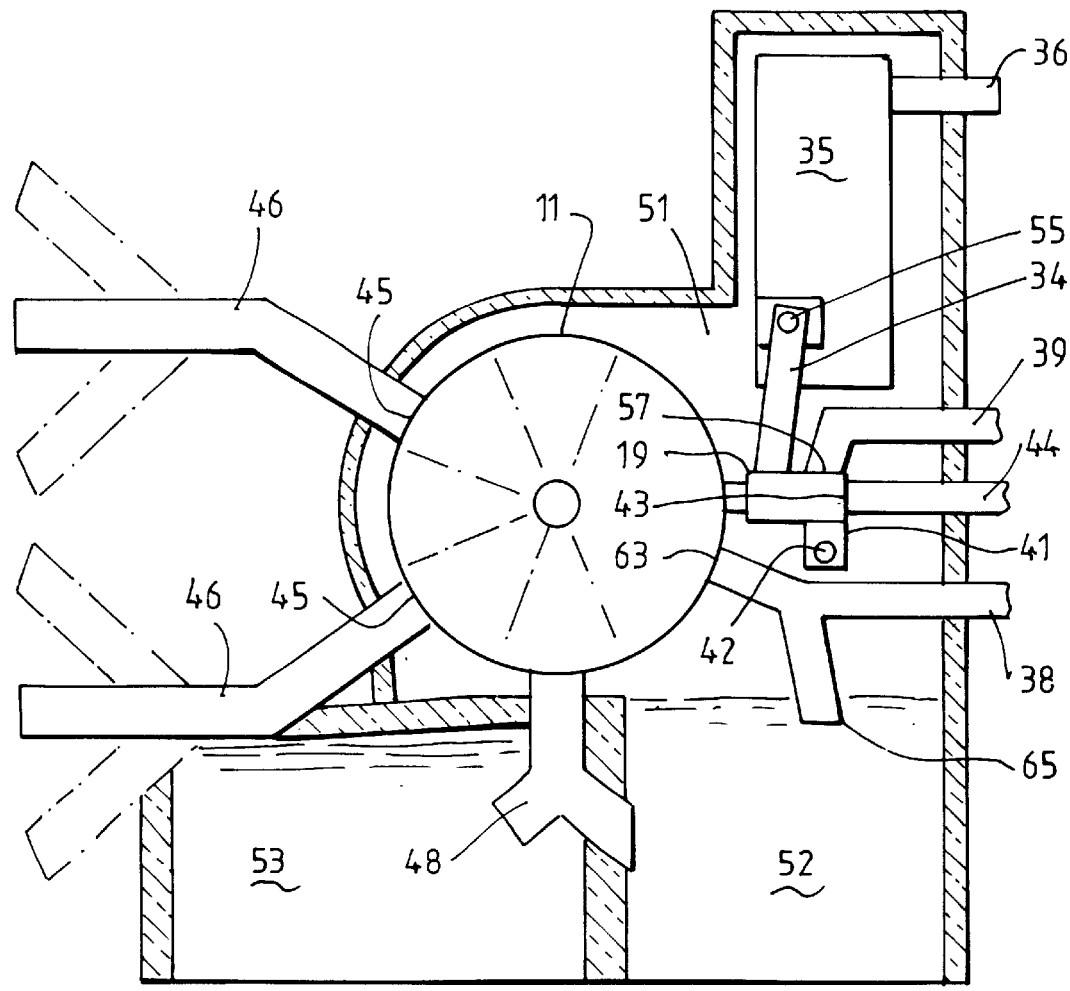
FIG. 3 is a diagrammatic plan of the smelting vessel and the molten metal and slag handling facilities in the installation.

FIG. 2 and 3 illustrate the manner in which the layout of the installation is divided into four functional zones spaced circumferentially around the vessel 11 and radiating outwardly of the central upright axis of the vessel. These zones are as follows:

Zone 1: General Access and Services
This zone contains:
the "footprints" of the overhead hot gas delivery duct 31 and offgas duct 32;
the direct access route to a side entry door 33 in the reduction vessel 11.

Zone 2: Metal Tapping
  This zone contains:
  Forehearth 19 and a forehearth tapping launder 34.
  A holding furnace 35 and a tapping spout 36.
  An end-taphole 63, drill and launder 38.
  A holding furnace bypass launder 39.
  A forehearth surge launder 41 and drop chute 42.
  A forehearth drain taphole 43 and launder 44.
Zone 3: Slag Tapping
  This zone contains:
  Two slag notches 45 and launders 46.
  Dedicated water-cooled plugs and prickers (illustrated in FIG. 9).
  Shared mechanised launder cover (also seen in FIG. 9).
Zone 4: Slag Draining
  This zone contains:
  A primary slag drain taphole 47, mudgun, drill and launder 48.
  Access route to a second side entry door 49 in the reduction vessel 11.

The reduction vessel 11 and the above described ancillary equipment including the holding vessel 35, are installed over a drainage floor 51 leading to a break out containment pit 52. A slag drain pit 53 is also provided to receive slag from the slag drain launder 48.

Figure 4:
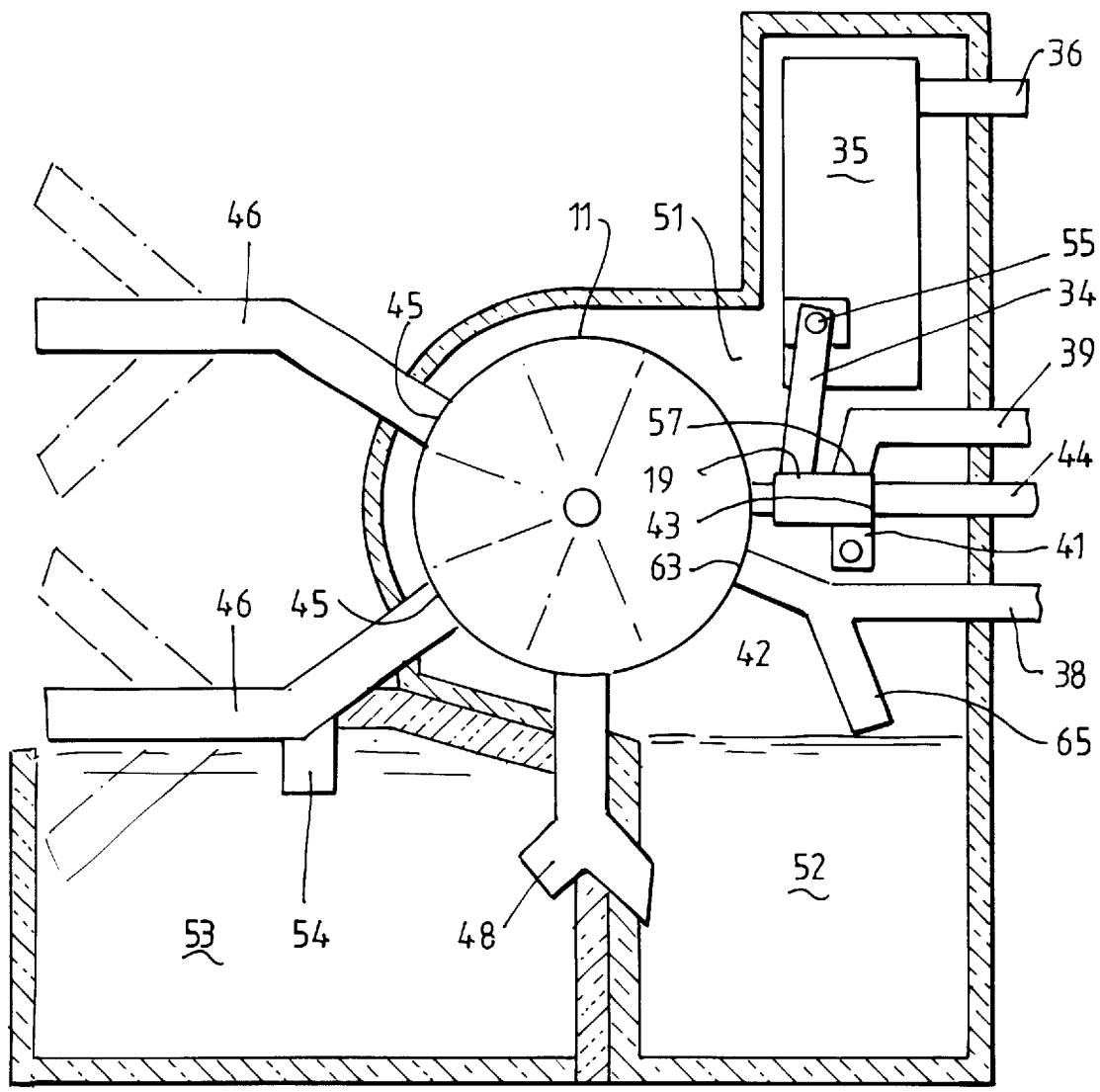
FIG. 4 is a diagrammatic plan similar to FIG. 3 but showing slightly modified slag handling facilities in regard to slag draining.
Figure 10:
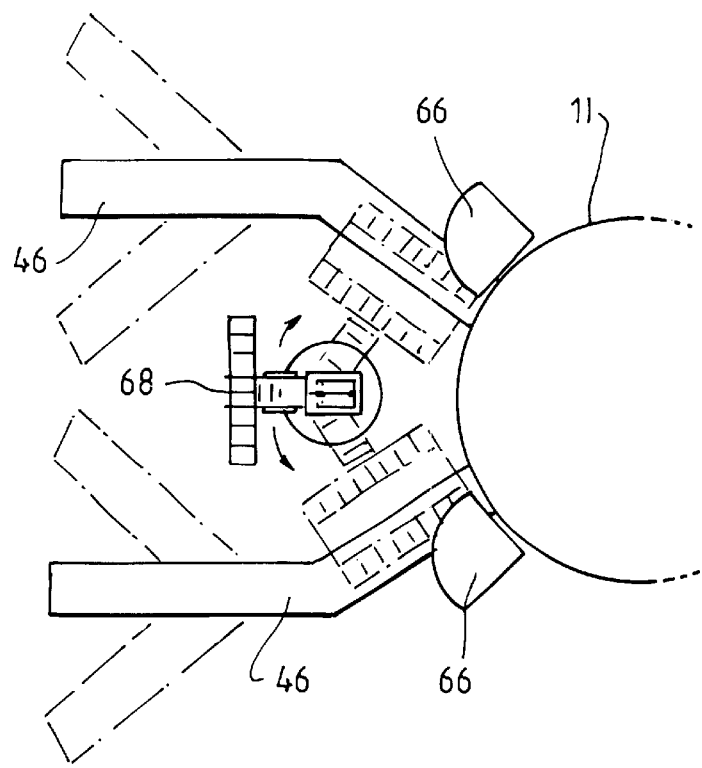
FIG. 10 is a diagrammatic plan of slag notch and launder facilities of the installation.

An alternative layout for the slag drain pit 53 is shown in FIG. 4. This option might be preferable where there is ground floor access restriction. It also has the advantage that it offers a more direct route for an emergency slag drain launder 54 to the slag drain pit.

The illustrated plant layout in accordance with the invention enables direct overhead crane access to as much of the cast house floor and its equipment as is practical. Two or more cranes may be provided. For example, a high lifting capacity "hot metal" crane may be installed to run above the break out containment pit 52, forehearth 19 and holding furnace 35 to enable hot metal ladle transport (for charging vessel 11), break out containment pit skull handling, launder change out and general maintenance activities. A separate vessel maintenance crane may be installed to service the rest of the cast house floor and the reduction vessel 11. This crane may be used for general maintenance, consumable transport, launder and fixed launder cover change out, injection and hot gas lance handling and the moving of small mobile equipment in general lifting. Access to the vessel side entry door 33 is between the footprints of the overhead bridges for the hot air delivery duct 31 and the offgas duct 32. This enables ready access at all times by the vessel maintenance crane. Access to the side entry door 49 in Zone 4 requires removal of the slag drain tapping launder and the installation of temporary covers over any associated holes in the cast house floor.

The various functions to be carried out during smelting operations will now be described.

Metal Tapping

Forehearth tapping launder 34 extends directly from the back half of the forehearth 19 (nearest vessel) and over the top of the holding furnace 36. The launder inlet is located away from the front of the forehearth where any sudden upwelling of metal associated with a pressure surge is likely to be most pronounced. The discharge end of the launder 34 has a drop hole 55 to ensure that the liquid metal will land directly in the pool in the holding furnace. This is to avoid erosion due to impingement of the falling metal stream on the refractory lining.

The launder is directly accessible from above by a crane, facilitating easy change out and the holding furnace is also readily accessible by the same crane.

FIGS. 3 and 4 show a holding furnace bypass launder 39 having a dedicated inlet 57 located in the front half of the forehearth 19. This allows the entire forehearth tapping launder to be bypassed.

An alternative configuration is shown in FIG. 5. During normal operation the inlet to the inlet to the bypass launder would be dammed up as shown. During bypass operation, this dam would be replaced by one immediately downstream of the dog-leg. The advantages of this alternative arrangement include:
  A reduction in the number of forehearth outlets.
  Retention of the inlet at the rear end of the forehearth.
  Improved forehearth accessibility.
  Reduced congestion between the forehearth and the holding furnace.

FIGS. 3 and 4 also show a forehearth surge launder 41 and drop chute 42. This is to divert the bulk of the metal, resulting from sever pressure surge, down to the emergency break-out containment pit 52, via the sloping ground floor 51. A trench of sand or crushed slag could be built from the base of the drop chute to channel flow to the pit.

FIGS. 3 and 4 also show a forehearth drain taphole 43 and launder 44. These are located on one side of the forehearth to:
  provide maximum clear access;
  minimise the length of the launder; and
  minimise kinks and bends in the launder.

A forehearth eruption hood 50 is shown in FIG. 6. Its purpose is to contain flying metal droplets and hot gases/flame in the event of a violent forehearth eruption. Hot gases and flame is vented out through the top of this hood. The hood is supported on locating pins 60 fixed to the side of the support structure for vessel 11 and it is readily accessible by the "hot metal" crane so that it can be simply lifted off the support pins 60 for removal.

End tapping is carried out by use of an end-taphole 63, drill 64 and launder 38 as seen in FIGS. 3, 4 and 7 which shows a slightly modified forehearth draining arrangement with a connection to the end tap launder 38. The drill is of fixed pedestal design because it is a reliable and robust piece of equipment. A diverting launder 65 is provided to allow the vessel to be drained directly into the break-out containment pit 52 in an emergency, if the hot metal transport containers were unavailable.

Slag Notch Tapping

Figure 11:
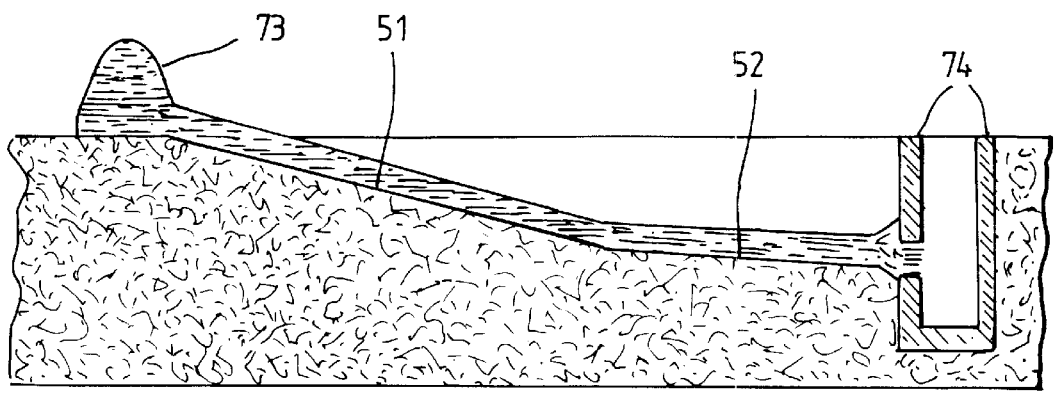
FIG. 11 is a schematic cross-section of break out containment facilities of the installation.

The slag notch and launder configuration/locations are shown in FIGS. 3, 4, 10 and 11. The locations 66 of slag notch plugging bots, prickers and mechanised launder cover 68 are shown in FIG. 11. The illustrated layout has the following features:
  The shared mechanised launder cover is placed between the launders as it does not require much operator access.
  It is preferred that the launder cover is mounted on a turn-table to simplify and speed up the changeover to the other slag notch.
  The bots and prickers (or mudguns and drills) are on the "outside" of the launders to maximise unobstructed operator access (which is more frequent than for the launder cover).
  The slag bots and prickers (or mudguns and drills) are of a pedestal mounted "over and under" design, located near the slag notch end of the launders. This is to minimise their combined "footprint areas" and hence maximise the clear space available for mobile equipment access (used for launder cleaning).
  Pedestal mounted bots and prickers (or mudguns and drills) are preferred to overhead rail mounted machines. This is because the trailing catenaries of the latter are believed to be vulnerable to damage by radiant heat and, in particular, flying slag and metal droplets. These are inevitable, particularly during slag notch plugging, because the vessel is pressurised.

The launder layout allows for a "slag trajectory catchment zone", roughly the length of the mechanised launder cover. This limits the maximum slope of the launder in this area and is to avoid erosion of the refractory lining of the cover.

The "wider spread" launder layout provides more space to accommodate the possible requirement of bifurcated launders and the associated slag pots.

Slag Drain Tapping

A primary slag drain taphole 47 and launder 48 is located in Zone 4 to minimise congestion and complexity. The location and configuration of these components are shown in FIGS. 3, 4, 8 and 9. A remotely located second emergency slag drain taphole allows the latter to be accessed independently of the first, minimising the exposure of personnel to splash, radiant heat and fume. The primary slag drain taphole 47 is integral with one of the vessel side entry doors 49 to make effective use of available casthouse floor space.

FIG. 9 shows a dedicated mudgun 71 and drill 72. The mudgun and drill may be an "over-and-under" pedestal mounted design, allowing them to be mounted on the same side of the taphole/launder on the slag notch side of the primary slag drain taphole/launder. This is to maximise the distance between them and the forehearth, to minimise exposure risk in the event of a forehearth eruption.

Break-Out Containment

The system for break-out containment is shown in FIGS. 3, 4 and 11. It includes the sloping drainage floor 57 under the reduction vessel 11, forehearth 19 and holding furnace 35. The floor 51 is sloped down into the break-out containment pit 52. The drainage floor 51 overlaps the footprints of the units mentioned and is bounded by a combination of bunds 73 and the slag drain pit walls 74. The floor of the break-out facilities may be formed of compacted soil (sand) covered with a layer of crushed slag, stone, or other suitable material. This is to minimise direct contact by slag and metal run-off as the soil (sand) is likely to contain some moisture. It is also to provide a permeable barrier for water to drain through and for steam to escape, in the event a water leak in conjunction with a break-out, alternatively a concrete formulation could be installed.

What is claimed is:

1. Direct smelting plant for producing molten metal from a metalliferous feed material including:
    a fixed smelting vessel to hold a molten bath having a metal layer and a slag layer on the metal layer and a gas space above the slag;
    a solids feed means to supply metalliferous feed material and carbonaceous material into the vessel;
    gas injection means extending downwardly into the vessel to inject oxidising gas into the gas space and/or the slag layer in the vessel;
    gas delivery duct means extending from a gas supply location away from the vessel to a delivery location above the vessel for delivery of oxidising gas into the gas injection means;
    offgas duct means for flow of offgas from an upper part of the vessel away from the vessel;
    a metal tapping means for flow of molten metal from the bath during a smelting operation out of a lower part of the vessel;
    a metal tapping launder to receive molten metal from the metal tapping means and to transport that molten metal away from the vessel;
    slag tapping means in a side wall of the vessel for tapping slag from the bath during a smelting operation; and
    slag tapping launder means to receive slag from the slag tapping means and to transport that slag away from the vessel;
        wherein the oxidising gas delivery duct means and the offgas duct means extend in a first of three discrete zones spaced circumferentially about the vessel and extending outwardly from the vessel;
        the metal tapping means and metal tapping launder are disposed in a second of said three zones; and
        the slag tapping means and slag tapping launder means are located in the third of said zones.

2. Direct smelting plant as claimed in claim 1, wherein the second and third zones are disposed to mutually opposite sides of the smelting vessel and the first zone is disposed between the second and third zones circumferentially of the vessel.

3. Direct smelting plant as claimed in claim 1, wherein the plant further comprises slag draining means for draining slag from the lower part of the vessel at the end of a smelting operation, that means being lower than the slag tapping means, and slag drain launder means to receive slag from the slag draining means and to transport it away from the vessel.

4. Direct smelting plant as claimed in claim 3, wherein the slag draining means and the slag drain launder are located in a fourth discrete zone extending outwardly of the vessel between the second and third zones.

5. Direct smelting plant as claimed in claim 4, wherein the fourth zone is disposed generally opposite to the first zone relative to the vessel.

6. Direct smelting plant as claimed in claim 1, wherein the metal tapping means comprises a metal flow forehearth projecting outwardly from the lower part of the vessel.

7. Direct smelting plant as claimed in claim 1, which further includes a metal holding means disposed away from the vessel and the metal tapping launder extends to the holding means to deliver molten metal into the holding means.

8. Direct smelting plant as claimed in claim 7, wherein the metal holding means is a holding furnace.

9. Direct smelting plant as claimed in claim 1, which further includes gas heating means at the gas supply location to supply hot gas to the gas delivery duct means for injection into the vessel.

10. Direct smelting plant as claimed in claim 9, wherein the gas delivery duct means comprises a single gas duct extending from the gas supply location to the delivery location.

11. Direct smelting plant as claimed in claim 1, wherein the solids feed means comprises one or more solids injection lances.

12. Direct smelting plant as claimed in claim 11, wherein there is a plurality of solids injection lances spaced circumferentially of the vessel.

13. Direct smelting plant as claimed in claim 11, wherein the or each of the lances extends downwardly and inwardly into the vessel through a side wall of the vessel.

14. Direct smelting plant as claimed in claim 1, wherein the slag tapping means comprises a pair of slag tapping notches in the side wall of the vessel.

15. Direct smelting plant as claimed in claim 1, wherein the vessel is disposed about a central upright axis and said zones radiate outwardly of the central axis outside the vessel.

16. Direct smelting plant as claimed in claim 1, wherein the reduction vessel is disposed over a sloping drainage floor leading to a breakout containment pit.

17. Direct smelting plant as claimed in claim 3, wherein there is a slag drain pit to receive slag from the slag drain launder means.

* * * * *